United States Patent
Nambu

(10) Patent No.: US 6,826,665 B1
(45) Date of Patent: Nov. 30, 2004

(54) DATA BACKUP METHOD AND SYSTEM

(75) Inventor: Masaya Nambu, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/532,902

(22) Filed: Mar. 22, 2000

(30) Foreign Application Priority Data

Sep. 7, 1999 (JP) .......................................... 11-253075

(51) Int. Cl.[7] .............................................. G06F 12/00
(52) U.S. Cl. ...................... 711/162; 711/112; 711/114; 711/147; 710/65; 710/74; 709/226; 709/203
(58) Field of Search ................................. 711/153, 173, 711/161, 162, 112, 114, 147; 707/204; 710/65, 74; 709/203, 226

(56) References Cited

U.S. PATENT DOCUMENTS

| | | | | |
|---|---|---|---|---|
| 5,392,244 A | * | 2/1995 | Jacobson et al. | 365/200 |
| 5,566,316 A | * | 10/1996 | Fechner et al. | 395/441 |
| 5,587,948 A | * | 12/1996 | Nakai | 365/185.17 |
| 6,006,308 A | * | 12/1999 | Matsunami et al. | 711/114 |
| 6,098,128 A | * | 8/2000 | Velez-McCaskey et al. | 710/65 |
| 6,163,856 A | * | 12/2000 | Dion et al. | 714/4 |
| 6,199,150 B1 | * | 3/2001 | Yoshikawa | 711/170 |
| 6,289,471 B1 | * | 9/2001 | Gordon | 714/6 |
| 6,330,621 B1 | * | 12/2001 | Bakke et al. | 710/5 |

* cited by examiner

Primary Examiner—Donald Sparks
Assistant Examiner—Ngoc V Dinh
(74) Attorney, Agent, or Firm—Staas & Halsey LLP

(57) ABSTRACT

In a multi-platform environment, data backup is performed which stores data from various different systems on several storage devices depending on the importance of the data and the reliability level of the backup storage devices. That is, data marked as important is stored on a backup storage device having a high reliability level and less important data is backed up onto a backup storage device having a lower reliability level. This allows the cost performance of the backup system to be optimized.

12 Claims, 3 Drawing Sheets

| Volume Name | File Name | Importance |
|---|---|---|
|  |  |  |

| File Name | Save Location (Backup Media) |
|---|---|
|  |  |

| Volume Name | File Name | Importance |
|---|---|---|
| V01 | FA1 | 1 |
| V01 | FA2 | 1 |
| V01 | FA3 | 2 |
| V02 | FB1 | 1 |
| V02 | FB2 | 2 |
| V02 | FB3 | 3 |
| V02 | FC1 | 1 |
| V03 | FC2 | 3 |
| V03 | FC3 | 3 |

| File Name | Save Location |
|---|---|
| FA1 | TL |
| FA2 | TL |
| FA3 | D1 |
| FB1 | TL |
| FB2 | D1 |
| FB3 | D2 |
| FC1 | TL |
| FC2 | D2 |
| FC3 | D2 |

DATA BACKUP METHOD AND SYSTEM

BACKGROUND OF THE INVENTION

The present invention relates to a data backup method and system, and more particularly, to a data backup method and system in a multi-platform environment.

Recently, computer systems having a "multi-platform" environment (or multi-vendor environment), in which computers having various different platforms are connected to a network, are being used. That is, computers having different platforms, such as a mainframe environment, a Unix environment and a Windows NT environment are connected to each other via the network and share data resources. For example, a database installed on a mainframe is accessed by a Unix computer. Unix is a registered trademark in the United States of America and other countries of the X/Open Company Limited, and Windows and Windows NT are registered trademarks of Microsoft Corporation. In such a system, data backup having high cost performance is required.

Conventionally, each computer has a backup device handled by the corresponding platform which backs up its data resources.

In recent years, distributed processing in which processing is distributed over a plurality of interconnected computers has been widely used. This improves convenience such as ease of changing system functions and human-machine interfaces, and improves reliability, such as localization of the effects of faults.

However, backing up data for each computer reduces the backup workability. Therefore, software that collectively controls storage devices (data resources) of a multi-platform environment has been used. For example, the software backs up the data of a whole system onto a tape library device of a mainframe. This is because the tape library device has redundancy and high reliability.

However, since the tape library device backs up unuseful data (for example, data used only by an NT client), the capacity of the tape library device must be very large. This increases the cost of the tape library device. That is, bit cost is increased. Further, the ratio of the amount of useful data is low as compared to the amount of storage capacity. Thus, the cost performance of backup is reduced.

SUMMARY OF THE INVENTION

An object of the present invention is to provide a high cost performance data backup system.

In one aspect of the present invention a method for saving plural pieces of data of a multi-platform environment on a plurality of storage devices is provided. First, an importance level of each piece of the plural pieces of data and a reliability level of each storage device are set. The plural pieces of data are saved on the plurality of storage devices in accordance with the set importance level and the set reliability level.

In another aspect of the present invention, a system for saving plural pieces of data of a multi-platform environment is provided. The system includes a plurality of storage devices each having a reliability level and a setting unit to set an importance level of each piece of the plural pieces of data and a save destination for each piece of the plural pieces of data based on the reliability level of the storage devices. A backup unit is connected between the plurality of storage devices and the setting unit to save the plural pieces of data on the plurality of storage devices in accordance the set importance level and the set save destination.

In yet another aspect of the present invention, a computer readable recording medium storing program code for saving plural pieces of data of a multi-platform environment on a plurality of storage devices is provided. The program code comprising the steps of setting an importance level of each piece of the plural pieces of data and a reliability level of each storage device, and saving the plural pieces of data on the plurality of storage devices in accordance with the set importance level and the set reliability level.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figures 2, 3, 4:
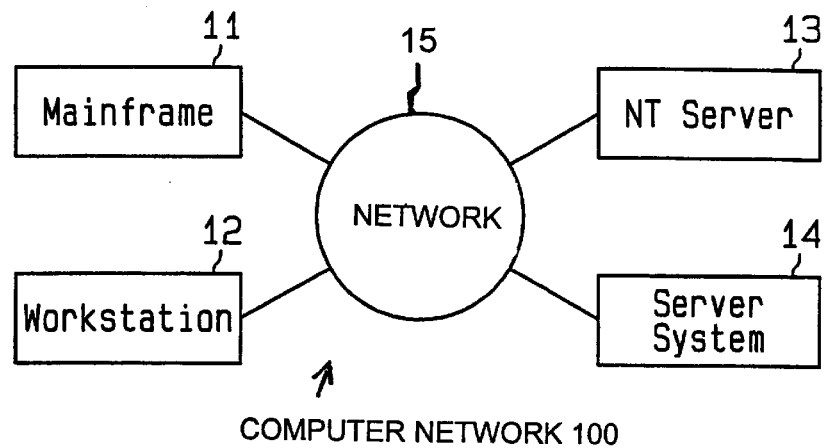
FIG. 2 is a schematic block diagram of a computer network including the server system of FIG. 1.
FIG. 3 is an illustration of a catalog in accordance with the present invention.
FIG. 4 is an illustration of a control data set (CDS) list in accordance with the present invention.

FIG. 2 is a schematic diagram of a computer network 100. The computer network 100 is a loop-type and formed by a mainframe 11, a workstation 12, an NT server 13 and a server system 14, and a network 15 interconnecting the mainframe 11, the workstation 12, the NT server 13 and the server system 14.

For example, the mainframe 11 uses a predetermined operating system as a platform and has a storage medium (storage) mounted under a predetermined volume name. The workstation 12 uses the Unix operating system as a platform and has a storage medium (storage) mounted under a predetermined volume name. The NT server 13 uses Windows NT as a platform and has a storage medium (storage) mounted under a predetermined volume name.

The server system 14 includes a backup storage device which backs up the data handled by the mainframe 11, the workstation 12 and the NT server 13. The server system 14 collectively controls the storage of this multi-platform environment. Specifically, the server system 14 performs:

Centralized backup of network data;

Backup media (tape libraries) management;

Automatic scheduling of backup jobs;

Hierarchical storage management (HSM); and

Database backup.

The server system 14 includes a plurality of storage devices having varying levels of reliability. The reliability of a storage device has a correlation with the data bit cost of the storage device. That is, the bit cost of a storage device having high reliability is higher than that of a storage device having low reliability.

The server system 14 has an importance level for the storage device of each platform and optimizes an object to be backed up in accordance with the importance level. That is, the data of high importance is stored in a storage device having high reliability and the data of low importance is stored in a storage device having low reliability. This reduces the amount of data stored in the storage device having high reliability compared with that of a conventional storage device. Accordingly, the cost required for backing up all of the data on the computer network 100 is reduced. That is, the cost performance of the data backup system is increased.

The server system 14 in the embodiment is implemented with a computer program which is executed on a computer used for a general use, such as a personal computer or a workstation.

The computer comprises a processor, a main storage device, an auxiliary storage device and an I/O device and executes the computer program. The computer program is stored on a portable medium, such as a floppy disk or a CD-ROM, and in a main storage device or an auxiliary storage device of another computer connected to the network 15.

The computer program is loaded, copied or otherwise installed from the portable medium onto the main storage device of the computer to the auxiliary storage device, and then to the main storage device. When the computer program is received from another device connected to the network 15, after it has been received, it is copied or installed on the auxiliary storage device and loaded into the main storage device.

Next, the server system 14 is described in detail.

Figure 1:
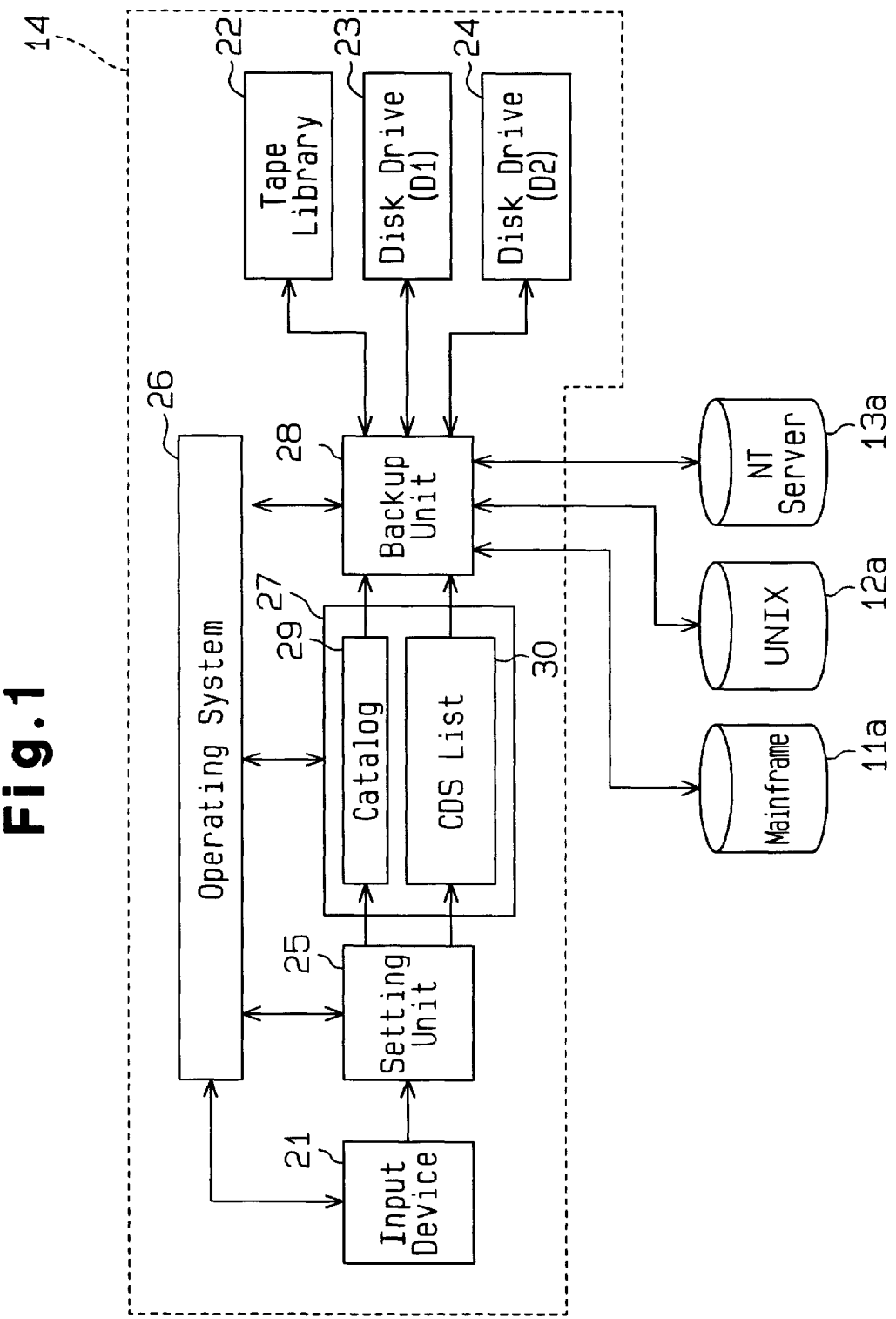
FIG. 1 is a schematic block diagram of a server system.

FIG. 1 is a schematic block diagram of the server system 14. The server system 14 comprises an input device 21, a plurality of backup storage devices 22, 23 and 24, a setting unit 25, an operating system 26, a setting storage unit 27 and a backup unit 28.

The first storage device 22 is a tape library device (TL), the second storage device 23 is a magnetic disk drive (D1) and the third storage device 24 is a magnetic disk drive (D2). The first to third storage devices 22 to 24 have different reliability by providing dual storage and/or error correcting and checking codes. In this embodiment, the first storage device 22 has the highest reliability and the third storage device 24 has the lowest reliability. That is, in this embodiment, the first storage device 22 has a dual storage structure and/or stores data with error correcting and checking codes.

The input device 21 is used to enter JCL (job control language) or a command by the operator. The operating system 26 activates the setting unit 25 and the backup unit 28 in response to the command provided from the input unit 21.

The setting unit 25 sets a software attribute (importance level of data or file) and a hardware attribute (reliability level of a backup storage device) in the setting storage unit 27 in accordance with the input command and data (either input with the command or preset).

The setting storage unit 27 has an area for storing a catalog 29 and a control data set (CDS) list 30 in which the data attribute and the hardware attribute for all of the data on the network 15 are set. A software attribute (data importance level) is set in the catalog 29 and the hardware attribute (reliability level of a backup storage device) in the CDS list 30.

Specifically, the catalog 29, as shown in FIG. 3, has areas for storing the location (volume name) in which a file exists, its file name and the importance of the file. The CDS list 30, as shown in FIG. 4, has areas for storing a file name and its save location (backup media).

The save location is set so that a file having high importance is backed up in a storage device having high reliability, based on the reliability levels and the importance levels, to thereby optimize the safety of an object to be backed up.

The backup unit 28 selectively saves the data stored in a disk drive 11a of the mainframe 11, the data stored in a disk drive 12a of the workstation 12, and the data stored in a disk drive 13a of the NT server 13 to the first to third storage devices 22 to 24 (i.e., the tape library (TL) and the disk drives D1, D2) in accordance with the importance levels based on the information of the catalog 29 and the CDS list 30.

Figures 5, 6A, 6B:
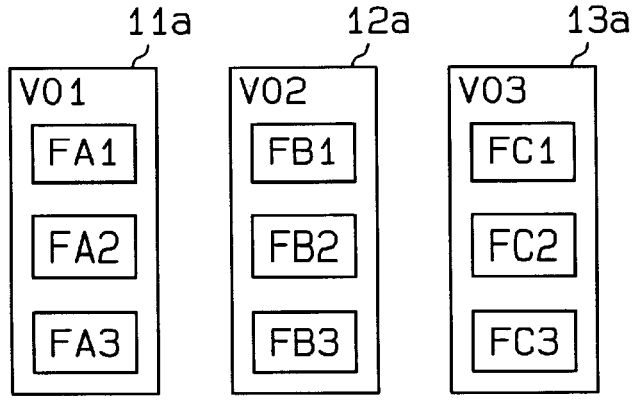
FIG. 5 is an illustration of storage in accordance with the present invention.
FIGS. 6(a) and 6(b) are illustrations of a catalog and a CDS list in accordance with the present invention.

Next, the backup of the data by the server system 14 is described in accordance with FIG. 5 and FIG. 6.

Now, as shown in FIG. 5, the disk drive 11a of the mainframe 11 is located under volume name V01 and the disk drive 11a stores files to which file names FA1, FA2 and FA3 are attached, respectively. The disk drive 12a of the workstation 12 is located under volume name V02 and the disk drive 12a stores files to which file names FB1, FB2 and FB3 are attached, respectively. The disk drive 13a of the NT server 13 is located under volume name V03 and the disk drive 13a stores files to which file names FC1, FC2 and FC3 are attached, respectively.

The operating system 26 of FIG. 1 activates the backup unit 28 in response to a backup start command input via the input unit 21, for example after finishing routine work.

First, the backup unit 28 backs up a file having high importance in the first storage device 22 having high reliability in accordance with the importance information of the catalog 29. That is, the backup unit 28 backs up the files FA1, FA2, FB1 and FC1 of importance level 1 in the first storage device 22 (tape library TL) whose reliability level is highest. Further, the backup unit 28 backs up the files FA3 and FB2 of importance level 2 in the second storage device 23 (disk drive D1) whose reliability level is next highest. Finally, the backup unit 28 backs up the files FB3, FC2 and FC3 of importance 3 in the third storage device 24 whose reliability level is lowest.

As described above, the embodiment has the following advantages.

The server system 14 manages a hardware attribute and a data attribute using the catalog 29 and the CDS list 30 and then executes back up with high cost performance.

It should be apparent to those skilled in the art that the present invention may be embodied in many other specific forms without departing from the spirit or scope of the invention. Particularly, it should be understood that the invention may be embodied in the following forms.

(1) The server system 14 may collectively control all types of storage including a storage of another computer connected to the network including the mainframe 11, the workstation 12, and the NT server 13. Further, the server system 14 may back up data stored in a storage device connected to a network and accessed from each platform.

(2) The number of importance levels to be set and the number of storage devices may be changed. For example, two or four or more importance levels can be set. Further, a server system having the first and second storage devices 22 and 23 of FIG. 1. may be formed. In this case, the save location is changed in accordance with the capacities of the storage devices. For example, the file of importance level 1 is backed up on the first storage device 22 and the files of importance levels 2 and 3 are backed up on the second storage device 23. Alternatively, the files of importance levels 1 and 2 are backed up in the first storage device 22 and the file of importance level 3 is backed up in the second storage device 23.

(3) The present invention may be adapted to a computer network, such as a bus type, a ring type, a star type, a mesh type and a point-to-point type. Both wire and wireless data communication can be used.

(4) The present invention may be adapted to another connection, such as an online connection in which a plurality of computers interconnected.

(5) The importance information and the backup media may be set in units of volume. In this case, a volume name, importance information and backup madia are set in the catalog 29 and the CDS list 30. This reduces the person-hours of work by setting the collective backup of a plurality of files.

(6) The file may be backed up in accordance with a operational speed of a storage device. The operational speed corresponds to the reliability of the storage device. That is, a storage device having a fast operational speed (read and write speed) has a high reliability and the bit cost of the data stored in the storage device is higher than that of a storage device whose operational speed is slow. Thus, high cost performance backup is achieved.

Therefore, the present examples and the embodiment are to be considered as illustrative and not restrictive and the invention is not to be limited to the details given herein, but may be modified within the scope and equivalence of the appended claims.

What is claimed is:

1. A method for saving a plurality of data resources on a plurality of storage devices, the plurality of data resources being shared by a plurality of platforms, the method comprising:

setting an importance level of each data resource and a reliability level of each storage device; and saving each data resource on one of the plurality of storage devices in accordance with the set importance levels and the set reliability levels, wherein each importance level is set relatively high when the associated data resource is shared by a relatively high number of the plurality of platforms, and wherein the saving includes saving the data resources that have a relatively high importance level on the storage device that has a relatively high reliability level, wherein each reliability level is set relatively high when the associated storage device has a relatively high data bit cost or a relatively fast operational speed.

2. The method of claim 1, wherein the storage device having the relatively high reliability level has a dual storage structure and/or stores the data resources with error correcting and checking codes.

3. The method of claim 1, wherein the setting includes setting an operational speed of each of the plurality of storage devices, and the saving includes saving the plurality of data resources on the plurality of storage devices in accordance with the set importance levels and the set operational speeds.

4. A system for saving a plurality of data resources that are shared by a plurality of platforms, comprising:

a plurality of storage devices each having a reliability level;

a setting unit for setting an importance level and a save destination of each data resource based on the reliability levels of the plurality of storage devices; and a backup unit, connected between the plurality of platforms and the setting unit, for saving the plurality of data resources on the plurality of storage devices in accordance the set importance levels and the set save destinations, wherein each importance level is set relatively high when the associated data resource is shared by a relatively high number of the plurality of platforms, and wherein the backup unit saves the data resources that have a relatively high importance level on the storage device that has a relatively high reliability level, wherein each reliability level is set relatively high when the associated storage device has a relatively high data bit cost or a relatively fast operational speed.

5. The system of claim 4, wherein the setting unit includes:

a catalog for storing the importance levels; and a control data set list for storing the save destinations and the reliability levels.

6. The system of claim 4, wherein the backup unit optimizes the save destination of each of the plurality of data resources in accordance with the set importance levels and the reliability levels.

7. The system of claim 4, wherein the storage device that has the relatively high reliability level has a dual storage structure and/or stores the data resources with error correcting and checking codes.

8. The system of claim 4, wherein the setting unit sets an operational speed for each of the plurality of storage devices and the destination of each of the plurality of data resources is based on each operational speed.

9. A computer readable recording medium storing program code for saving a plurality of data resources on a plurality of storage devices, the plurality of data resources being shared by plurality of platforms, the program code comprising:

setting an importance level of each data resource and a reliability level of each storage device; and saving each data resource on one of the plurality of storage devices in accordance with the set importance levels and the set reliability levels, wherein each importance level is set relatively high in association when the associated data resource is shared by a relatively high number of the plurality of platforms, and wherein the saving includes saving the data resources that have a relatively high importance level on the storage device that has a relatively high reliability level, wherein each reliability level is set relatively high when the associated storage device has a relatively high data bit cost or a relatively fast operational speed.

10. The recording medium of claim 9, wherein the storage device that has the relatively high reliability level has a dual storage structure and/or stores the data resources with error correcting and checking codes.

11. The recording medium of claim 9, wherein the setting includes setting an operational speed of each of the plurality of storage devices, and the saving includes saving the plurality of data resources on the plurality of storage devices in accordance with the set importance levels and the set operation speeds.

12. A system for storing a plurality of data resources, which are shared by plurality of platforms, in a plurality of storage devices, comprising:

the plurality of storage devices, each storage device having a reliability level;

a setting unit to set an importance level and a save location of each of the plurality of data resources and to set the reliability level of each of the plurality of storage devices, wherein the importance levels are set relatively high when the associated data resource is shared by a relatively high number of the plurality of platforms;

a storage unit to store the importance levels in a catalog and to store the save locations in a list; and a backup unit to save each data resource in one of the plurality of storage devices according to the save location of the data resource, wherein the save locations are set so that each data resource that has a relatively high importance level is saved in the storage device that has a relatively high reliability level, thereby optimizing the safety of the data resources that have a relatively high importance level, wherein each reliability level is set relatively high when the associated storage device has a relatively high data bit cost or a relatively fast operational speed.

* * * * *